Figure 13:
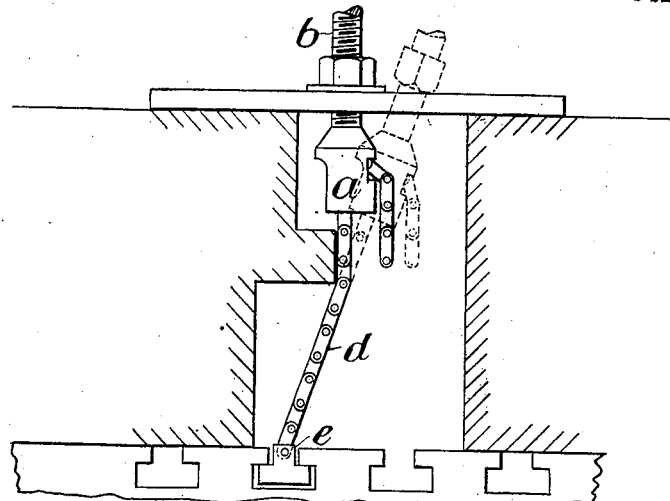

No. 826,131. PATENTED JULY 17, 1906.
W. A. WEAVER.
ADJUSTABLE SCREW BOLT.
APPLICATION FILED AUG. 1, 1905.
2 SHEETS—SHEET 1.
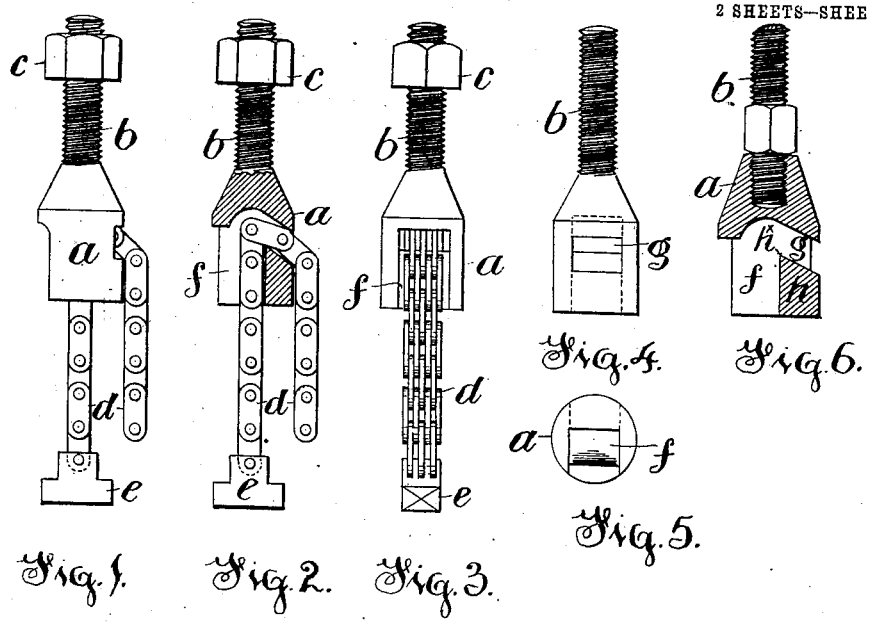
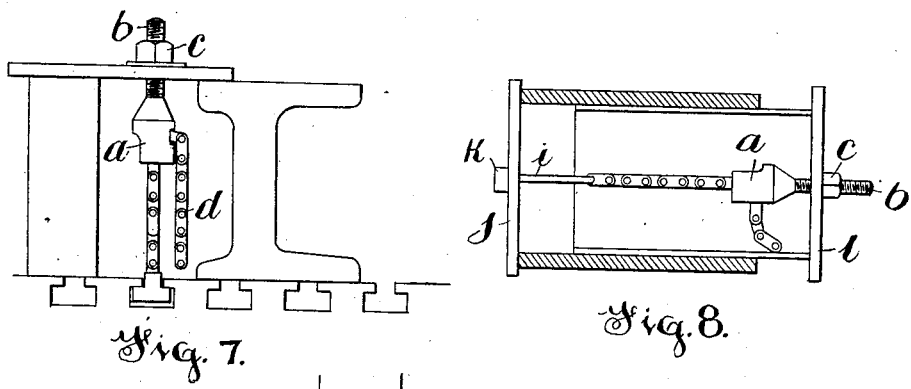
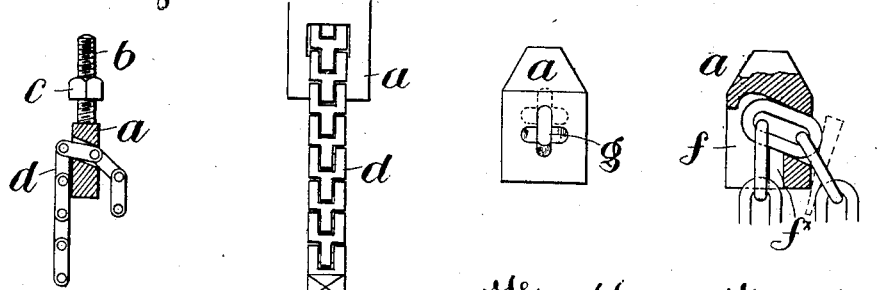
Witnesses:
Pickles D. Bailey.
Emily Ross.
Inventor:
W. A. Weaver
By his Attorney: Walter Gunn.

No. 826,131. PATENTED JULY 17, 1906.
W. A. WEAVER.
ADJUSTABLE SCREW BOLT.
APPLICATION FILED AUG. 1, 1905.

2 SHEETS—SHEET 2.

Witnesses:
Pickles D. Bailey.
Emily Potts.

Inventor:
W. A. Weaver
By his Attorney: Walter Gunn.

UNITED STATES PATENT OFFICE.

WILLIAM ARTHUR WEAVER, OF MANCHESTER, ENGLAND.

ADJUSTABLE SCREW-BOLT.

No. 826,131.  Specification of Letters Patent.  Patented July 17, 1906.

Application filed August 1, 1905. Serial No. 272,243.

*To all whom it may concern:*

Be it known that I, WILLIAM ARTHUR WEAVER, a subject of the King of Great Britain and Ireland, and a resident of Manchester, England, have invented Improvements in Adjustable Screw-Bolts, of which the following is a specification.

This invention relates to and consists of an adjustable screw-bolt of such design as to give instantly any length from two inches upward by means independent of the nut and screw-thread which form parts of the said adjustable screw-bolt.

According to the invention the improved device consists of a casting or block of metal formed at one part as a screw-threaded bolt or stem and provided with a nut and at another part formed to receive a steel chain and allow such chain to move freely through it in adjusting the length of the bolt and after adjustment lock such chain by one of its links. The chain is preferably of the flat-link type and is of sufficient strength to withstand any strain applied by nut and screw. At one end of the chain is a bolt-head which in size is in proportion to the diameter of the bolt or screw-threaded part of the casting.

The device thus produced is designed for a variety of useful purposes, such as the bolting or clamping of work to a machine bed or table, the drawing of liners into cylinders, and for any purpose for which a long screw or bolt is necessary.

To permit of my invention being clearly understood, I will further describe the same with the assistance of the accompanying drawings, whereon—

Figure 1 illustrates a side elevation, Fig. 2 a vertical section, and Fig. 3 a front elevation, of the improved adjustable bolt. Fig. 4 illustrates a front view, and Fig. 5 an inverted plan, of the block or casting separately. Fig. 6 illustrates a vertical section of a modification. Figs. 7, 8, and 9 illustrate various uses of the invention. Figs 10, 11, 12, 13, 14, and 15 illustrate modifications.

As shown, $a$ is the block or casting forming the main feature of my invention; $b$, the screw-threaded stem or bolt part, with nut $c$. $d$ is the steel chain, and $e$ the bolt-head (or T-block) secured to the chain end.

In the form shown in Figs. 1 to 4 the bolt part $b$ is cast in one with the block $a$, this being suitable for the smaller sizes of the improved bolt or for light work. For larger sizes or for heavy work the stem or bolt is made separately and tapped into the block, as shown in Fig. 6.

In the block is formed (cast) the cavity $f$, into which opens a passage $g$, this latter extending from the outer face of the block to the cavity and being arranged at an angle therewith of about sixty degrees, so that at the point where the passage and cavity meet the block is of V-section, as shown in Fig. 6. Through the said cavity and passage loosely passes the chain $d$, and the width of the cavity and passage is slightly greater than that of the chain. The depth of the passage is also slightly greater than the thickness of the chain, but only to an extent which enables the chain to pass readily through when moved in a direction parallel with the passage.

With the chain threaded through the passage $g$ the improved adjustable bolt is ready for use. If required, say, for clamping work to a machine-table, the bolt-head $e$ is first introduced into one of the table-slots. (See Fig. 7.) A plate or clamp is then placed below the nut $c$ with one end resting on the work to be clamped and the other end supported by suitable packing. The chain $d$ having been adjusted through the block and nut until the nut is, say, half-way along the bolt, the nut is tightened up until it meets and presses against the clamping-plate, when the chain, due to the bend caused by the passage $g$, binds in the said passage, and thus resists any tendency of the chain to slip through the block, the link for the time being within the passage taking its fulcrum at one end on the edge $h$ and pressing against the upper face of the passage at the other end, as shown in Fig. 2. With the nut fully tightened up the work is securely clamped to the machine-table. For clamping work of a larger or smaller size the nut $c$ is slackened, the chain drawn through the passage $g$ until there is either a greater or lesser length between the block and bolt-head $e$, when the nut $c$ is again tightened up, the chain automatically locking itself for any length of bolt required.

The upper part of the cavity $f$ is arched, and at one side the cavity $f$ is open to allow of the ready adjustment and insertion of the chain. The width of the cavity or that of the part $h$ is such as to insure that when the chain is in position its depending portion within the block is exactly in line with the bolt $b$, and therefore causes the pull of the block to be directly central on the chain.

In Fig. 9 I show how parts of the block may be dispensed with and only the part with the angular passage be retained; but it will at once be seen that the bolt $b$ is not directly over the chain and will not give the same direct pull as it does in the case of the block shown in Figs. 1 and 2.

For small sizes or for light work the improved chain is of the multilink kind, (see Fig. 3;) but for large sizes and heavy work the chain is preferably of the solid-link kind, as shown in Fig. 13, which allows of stout connecting-pins being used and gives great strength.

In Fig. 8 I show how the improved adjustable bolt may be used for drawing a liner into a cylinder and how it may be combined with a rod $i$, the rod being connected to the chain at one end and at the other end passing through a hole in a bar $j$ and having a bolt head or block $k$, which, lying behind the bar and the bar lying against the cylinder end, affords a resistance to the pull of the chain when tightened up by the nut $c$, the bolt passing through a further bar $l$, which lies against the liner end. By tightening the nut the liner is forced into the cylinder. When the nut is fully screwed on the bolt, it is slackened off again, the chain shortened, and the nut again tightened up, and so on until the liner is "home."

Figure 14:
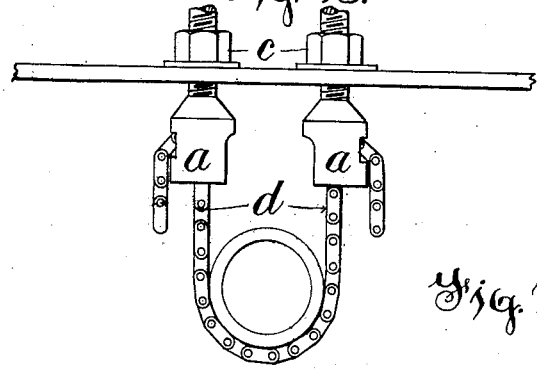

In Fig. 13 I show how the improved bolt, being flexible, can be used at an angle, a feature not possessed by an ordinary clamping-bolt, and in Fig. 14 I show how two blocks may be used with one chain, and be used for supporting as well as clamping purposes.

Figure 15:
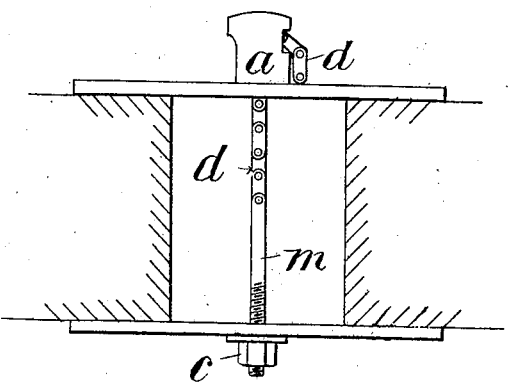

In Fig. 15 I show how the block may be formed and used without the bolt part and merely serve for chain-locking purposes, the nut for tightening the chain being on a rod $m$ connected to the chain; but as this form of my invention will seldom be suitable for machine-work I prefer the form shown in Figs. 1 and 2.

By dotted lines in Fig. 1 I show how the device may be duplicated—i. e., have two chains and a block, with two passages for locking the two chains—this form of the device being chiefly for use when a very powerful hold is required or where a large nut and bolt are required.

In Figs. 11 and 12 I show how an ordinary link-chain may be used, the passage $g$ being of cross-shape and the block being formed with a recess $f$ to allow room for the alternate links when they lie in the vertical plane of the passage $g$. With this form of chain the holding power of the block may be supplemented by a wedge inserted through the links, as shown by dotted lines, or the loose end of the chain may be tied in a knot; but usually the bite of the block will suffice.

Obviously the improved bolt may be used in the reverse way to that illustrated, the screwed part $b$ being below the block and the chain binding against the upper instead of the lower face of the passage $g$.

What I claim is—

An adjustable screw-bolt and nut consisting of a block with screw-threaded part and nut, and a chain with bolt-head or T-piece, the said block having a passage which lies at an angle of about sixty to the longitudinal axis of the block, through which the chain may freely pass when pulled in a direction parallel thereto, and by which the block is caused to automatically lock the chain when pulled in a direction parallel with the screw-threaded part of the block as set forth.

In witness whereof I have hereunto set my hand in the presence of two witnesses.

WILLIAM ARTHUR WEAVER.

Witnesses:
E. ROSS,
PICKLES D. BAILEY.